Sept. 10, 1935.　　　　　F. G. W. KING　　　　　2,014,255
TREAD FOR PNEUMATIC TIRES
Filed Feb. 17, 1934
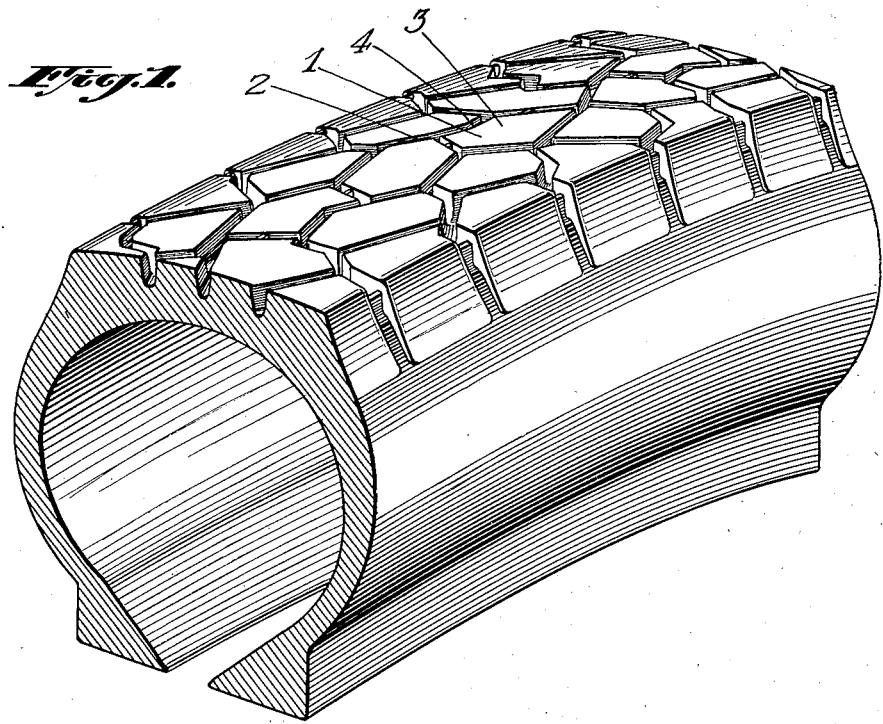
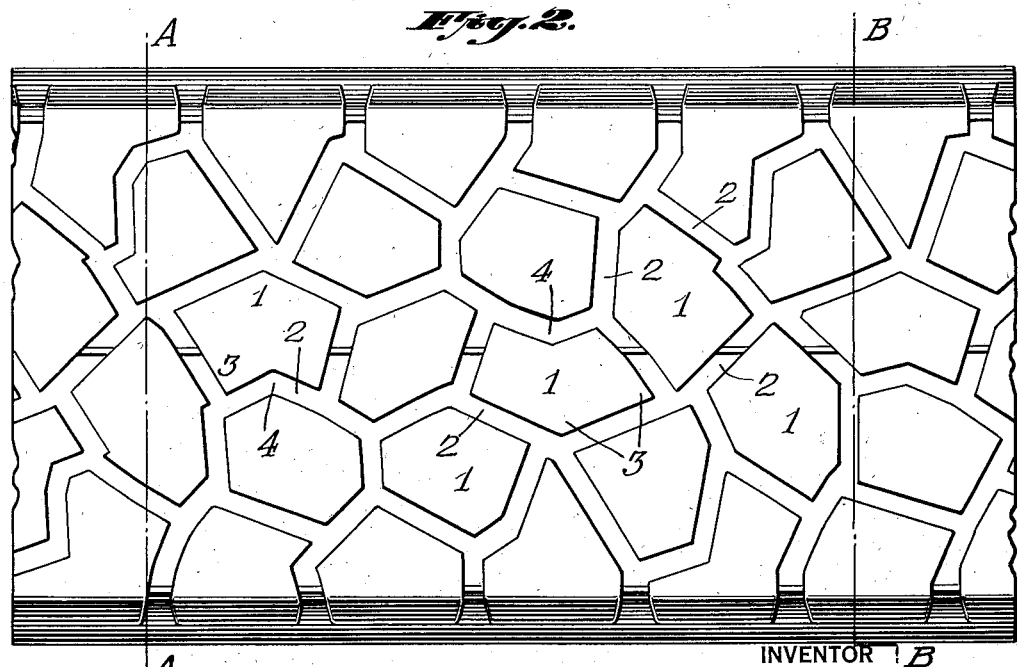
INVENTOR
FRANK G. W. KING.
BY
ATTORNEYS Patented Sept. 10, 1935

2,014,255

UNITED STATES PATENT OFFICE 2,014,255

TREAD FOR PNEUMATIC TIRES

Frank George William King, Sutton, Coldfield, England, assignor to Dunlop Tire and Rubber Corporation, Buffalo, N. Y., a corporation of New York Application February 17, 1934, Serial No. 711,633
In Great Britain February 18, 1933

3 Claims. (Cl. 152—14)

This invention concerns improvements in treads for pneumatic tires and is concerned with obtaining a greater degree of silence in running than has been found practicable hitherto with known types of tires.

The invention more particularly refers to improvements in the kind of tread described and claimed in the specification of my prior British Patent No. 385,240. In the specification referred to I described three alternative ways of diminishing the noise and, in particular, the whine due to the more or less regular frequency of the successive road contacts provided by the upstanding projections constituting the tread.

The first of these alternatives consisted in the use of tread blocks of varying size spaced by air passages of uniform width so that the intervals between the road contacts are irregular, one example of this construction being shown in the drawing forming a part of my prior specification.

The second alternative consisted in the provision of tread projections of the same size with irregularly varying distances between their centers or edges.

The third alternative consisted in a combination of the first and second alternatives by including some tread projections of the same size with unequal spacing combined with others which are not of the same size but between which the spacing is the same.

It will be apparent from the embodiment of the first alternative way of carrying out the invention described and shown by way of example in the parent patent, that there still remains some degree of symmetry in the arrangement of the projections transversely of the tire and that this arrangement results in the forward or leading edges of the group of studs engaging the ground at substantially the same time and also leaving the ground at substantially the same time.

The prior invention having substantially reduced or eliminated the whining audible note due to the unvarying frequency of contact of regularly spaced projections, it is the object of the present invention to still further diminish the degree of intensity of the pattering sound due to the simultaneous engagement and release of the front or rear edges of successive groups of tread projections by arranging them in such a way that there is no definite circumferential or transverse grouping, thus eliminating a succession of more or less grouped impacts and substituting therefor a larger number of more gradual impacts occurring with a greater but none the less irregular frequency.

A further feature of the invention arising from this modification in distribution consists in the improved distribution of stress over an irregular network of separating grooves or channels, rather than permitting their more or less localized incidence upon circumferential or transverse channels which, by their inclusion in this regular symmetrical form, tend to increase the rate of tire wear by localizing flexure along the lines of inferior resistance presented to local flexure along such regular circumferential or transverse lines.

According to this invention, a tread surface for pneumatic tires as claimed in my prior British Patent No. 385,240 is characterized by upstanding tread projections of irregular outline, and is further characterized in that the projections are separated by irregularly intersecting grooves which may be wholly or partly of non-uniform or of uniform width, and in which the grooves between the projections intersect any two parallel lines drawn across that portion of the tread in contact with the road at different intervals and with varying angularity, the arrangement of the projections constituting the tread pattern of one segment of the tire being repeated in one embodiment by adjacent segments of the same pattern around the whole circumference of the tire, the length of such segment being not less than the length of the tread in contact with the road surface.

In order that the invention may be more easily understood and readily carried into effect, the same will now be described with reference to the accompanying drawing, in which—

Fig. 1 is a perspective view, partly in section, of a tire tread embodying the invention, and Fig. 2 is a development view of the face of said tread.

In the embodiment of the invention shown, the upstanding projections 1 which constitute the tread surface, present the characteristic appearance of a path paved with irregular flat stones separated by fluid or air conducting channels 2.

Each projection 1 constitutes a multi-sided figure, the number of sides varying from three upwards so that each projection contains a plurality of salients 3, and may also contain one or more re-entrant angles 4 which may be defined by rectilinear or curvilinear walls.

These projections are so positioned that the grooves between them which permit the escape of air or other fluid intersect any two or more parallel lines drawn transversely across the tread as, for instance, at A. A. and B. B. with dissimilar intervals, this ensuring that the transverse lines of contact with which the projections engage or leave the ground are continuously varying in length and angle of approach or departure.

To reduce the difficulty and expense involved in devising an arrangement of the projections and their separating grooves such that a line drawn transversely across any part of the tire tread would intersect the grooves at different intervals and angularity throughout the whole of the circumference, I preferably arrange the projections and their grooves over one segmental length of tread corresponding to and preferably equal to or greater than the length of tread supported by the road surface at any instant.

The pattern of this segment which may extend between the lines A. A. and B. B. is then repeated around the tire by adjacent segments until the whole of the circumference has been completed, the length of the segment being adjusted as may be convenient.

I also prefer to place the projections so that their leading and trailing ends consist of salient angular portions so that these portions engage and quit the road surface with a gradually increasing and diminishing contact respectively, thereby breaking down successive contacts over a greater length at larger or longer intervals into a number of smaller more gradual and irregular contacts occurring more frequently at shorter intervals.

The side walls of individual projections may consist entirely of rounded surfaces or angular or linear surfaces, or may be a mixture, and I may arrange the intervening grooves so that the grooves between any adjacent pair of projections do not form a straight line.

I may also provide one or more circumferential or transverse ribs sunk beneath the tread level of the projections, and I may arranged that those projections which approach the side wall and define the edges of the tread on each side of the tire are of equal or unequal length, and may arranged into buttresses extending down the side wall of the tire, the buttresses being of equal or unequal length, with central or other cavities, or alternatively being shaped to form multi-sided irregular outlines, the top and lower edges of which are preferably parallel.

It will be apparent that a single stud or group of studs of a regular or well known outline may be included and that such a stud or studs will be readily identified by the contrast with all those of irregular shape surrounding it.

I may, therefore, include such a stud or group of studs at one or more parts of the tread and dispose this stud or studs circumferentially or transversely of the tread.

What I claim is—

1. A pneumatic tire having a pattern of upstanding tread projections of iregular outline and irregularly intersecting separating grooves, said pattern extending from one side of the tread surface to the other and said grooves extending substantially unbroken from one side of said tread surface to the opposite side and without forming a straight line along two consecutive projections and in which the grooves between projections intersect any two parallel lines drawn across said tread pattern through successive projections at different intervals and with varying angularity within that part of the circumference of the tire that is at any time in contact with a road surface.

2. A pneumatic tire having a pattern of upstanding tread projections of irregular outline separated by grooves of substantially uniform width, the succession of the leading ends of said projections in either direction throughout said pattern being in irregular non-recurrent sequence.

3. A pneumatic tire having a pattern of upstanding tread projections of irregular outline, said projections being solid and free from hollows and from acute indentations in their side walls and being separated by grooves that are narrow relative to the surface areas of said projections and form a network extending from one side of the tread to the other, the succession of the leading ends of said projections in either direction throughout said pattern being in irregular non-recurrent sequence.

FRANK GEORGE WILLIAM KING.